Patented Sept. 1, 1942

2,294,711

UNITED STATES PATENT OFFICE 2,294,711

DIRECT PROCESS DUPLICATING FLUID

Johan Bjorksten, Chicago, Ill., assignor to Ditto, Incorporated, Chicago, Ill., a corporation of West Virginia No Drawing. Application July 31, 1941, Serial No. 404,834

4 Claims. (Cl. 41—31.6)

The invention relates to solvents, and more particularly to solvent mixtures, called direct process duplicating liquids, for use in duplicating processes wherein a copy sheet is moistened with the solvent mixture and applied to a master sheet containing characters or a design formed of soluble inks.

The solvents used in the above so-called spirit or direct process duplicating method should be good solvents for duplicating dyes such as the basic water and alcohol soluble dyes commonly used. They must spread instantly and uniformly on the copy paper and they must very rapidly evaporate to such an extent that the dye impression is fixed on the paper and further spreading or blurring is prevented.

Direct process duplicating liquids generally consist of one ingredient or group of ingredients which are dye solvents and which are highly volatile, and another group of substances having very low volatility. The former ingredients are primarily ethyl alcohol, methyl alcohol, and various hydrocarbon solvents such as those set forth in my co-pending application Serial No. 365,802, filed November 15, 1940. The slowly volatile ingredients, on the other hand, will remain in small quantities in the master, being absorbed into the wax-dye imprints so as to soften these and to bring the dye to a semi-plasticized condition in which it is particularly available to the solvent action of the more highly volatile solvent ingredients present. Of substances used for this purpose may be mentioned primarily the ether alcohols of the class represented by Cellosolve and Carbitol. Methyl Cellosolve is particularly advantageous, as disclosed in United States Patent No. 2,228,108.

While the ether alcohols possess properties desirable for this purpose, they do have the disadvantage of being to some extent subject to oxidative decomposition, which results in an acidic condition of the liquid. This in turn is apt to result in a measure of corrosion of metal parts in the duplication machines exposed to the action of these substances.

For this reason it is desirable to employ substances of solvent and volatility characteristics similar to those of these ether alcohols, but having a structure free from ether linkages. However, the majority of substances tried for this purpose have not been found satisfactory. For example, glycerin, while being otherwise suitable, is deficient in dye solvency. Ethylene glycol and diethylene glycol, while having adequate dye solvency, possess the wax-dye plasticizing properties to an excessive degree. Even when used in relatively small amounts, they cause a premature breakdown of the master so that only a short run of copies can be produced.

It has now been found that polyhydric alcohols containing two or more oxy groups on a branched carbon chain, and being distillable substantially without decomposition at atmospheric pressure, possess the characteristics required in a duplicating liquid, in conjunction with the requisite stability. The invention is illustrated by the following examples:

Example I 10 parts by weight of 2-methyl-2,4-pentane diol
5 parts by weight of water
85 parts by weight of ethyl alcohol

Example II 5 parts by weight of 3-methyl,2,4-pentane diol
15 parts by weight of water
80 parts by weight of ethyl alcohol

Example III 10 parts by weight of 2-methyl,1,3 propane diol
10 parts by weight of isopropyl alcohol
80 parts by weight of ethyl alcohol

Example IV 20 parts by weight of 2,2, dimethyl 1, 3 propane diol
80 parts by weight of ethyl alcohol

Example V 3 parts by weight of Pinacol
5 parts by weight of isopropyl alcohol
5 parts by weight of water
80 parts by weight of ethanol
7 parts by weight of methanol

Example VI 10 parts by weight of 3,4 diethyl 3,4 hexane diol
5 parts by weight of water
85 parts by weight of ethyl alcohol While in these examples the substances mentioned have been diols of the saturated series, it is fully realized that the invention is not necessarily restricted to these compounds. Alcohols having a greater number of hydroxyl groups or being to some extent unsaturated may also be used for the purpose of the invention provided they are distillable substantially without decomposition. I have found that the quality of withstanding distillation temperatures without decomposition has a direct correlation to the stability of these liquids in direct process liquid, and that substances of this class which are distillable without decomposition at atmospheric pressure will show satisfactory properties in the liquid.

Furthermore, the introduction of substituents in the alcohol molecule is not objectionable provided that such modifications in the molecular structure do not impair the stability as evidenced by the ability to distil at atmospheric pressure substantially without decomposition.

From the above disclosure, it is apparent that the invention is capable of wide variations without substantial departure from the spirit or scope of the invention.

I claim:

1. A solvent adapted for use in direct process duplicating comprising ethyl alcohol, and a polyhydric alcohol containing at least two oxy groups on a branched carbon chain, said polyhydric alcohol being distillable without decomposition at atmospheric pressure.

2. A solvent adapted for use in direct process duplicating comprising ethyl alcohol and 2-methyl-2, 4-pentane diol.

3. A solvent adapted for use in direct process duplicating comprising ethyl alcohol and 3-methyl, 2, 4-pentane diol.

4. A solvent adapted for use in direct process duplicating comprising ethyl alcohol and 2,2,dimethyl 1, 3 propane diol.

JOHAN BJORKSTEN.